(12) United States Patent
Muraoka et al.

(10) Patent No.: US 10,970,488 B2
(45) Date of Patent: Apr. 6, 2021

(54) FINDING OF ASYMMETRIC RELATION BETWEEN WORDS

(71) Applicant: INTERNATIONAL BUSINESS MACHINES CORPORATION, Armonk, NY (US)

(72) Inventors: Masayasu Muraoka, Tokyo (JP); Tetsuya Nasukawa, Kanagawa-ken (JP); Khan Md. Anwarus Salam, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 16/287,326

(22) Filed: Feb. 27, 2019

(65) Prior Publication Data
US 2020/0272696 A1 Aug. 27, 2020

(51) Int. Cl.
*G06F 40/30* (2020.01)
(52) U.S. Cl.
CPC .................................. *G06F 40/30* (2020.01)
(58) Field of Classification Search
CPC ......... G06F 40/30; G06F 40/42; G06F 16/243
USPC ............................................................ 704/9
See application file for complete search history.

(56) References Cited

U.S. PATENT DOCUMENTS

| | | | | |
|---|---|---|---|---|
| 7,165,024 | B2 * | 1/2007 | Glover ................. | G06F 16/355 704/9 |
| 7,805,303 | B2 * | 9/2010 | Sugihara ............. | G06F 16/3329 704/257 |
| 7,953,719 | B2 * | 5/2011 | Straut ................. | G06F 11/3438 707/705 |
| 8,543,563 | B1 * | 9/2013 | Nikoulina ............... | G06F 40/42 707/706 |
| 8,676,574 | B2 * | 3/2014 | Kalinli ................ | G10L 15/1807 704/207 |
| 8,676,937 | B2 * | 3/2014 | Rapaport ........... | H04N 21/8358 709/219 |

(Continued)

OTHER PUBLICATIONS

Santus, Enrico, et al., "Chasing hypernyms in vector spaces with entropy," 14th Conference of the European Chapter of the Association for Computational Linguistics, EACL (European chapter of the Association for Computational Linguistics), 2014, pp. 38-42.

(Continued)

*Primary Examiner* — Susan I McFadden
(74) *Attorney, Agent, or Firm* — Tutunjian & Bitetto, P.C.; Randall Bluestone (57) ABSTRACT

A computer-implemented method for finding an asymmetric relation between a plurality of target words is disclosed. The method includes preparing a plurality of image sets, each of which includes one or more images relevant to a corresponding one of the plurality of the target words. The method also includes obtaining a plurality of object labels for each of the plurality of image sets. The method further includes computing a representation for each of the plurality of the target words using the plurality of the object labels obtained for each of the plurality of image sets. The method includes further determining whether there is an asymmetric relation between the plurality of the target words using representations computed for the plurality of the target words.

20 Claims, 6 Drawing Sheets

(56) References Cited

U.S. PATENT DOCUMENTS

| | | | |
|---|---|---|---|
| 8,755,629 B2* | 6/2014 | Bever | G06K 9/723 |
| | | | 382/275 |
| 9,311,297 B2* | 4/2016 | Bhatnagar | G06F 40/247 |
| 9,552,355 B2* | 1/2017 | Dymetman | G06F 40/44 |
| 9,710,760 B2 | 7/2017 | Hill et al. | |
| 9,852,379 B2* | 12/2017 | Beigman Klebanov | |
| | | | G06F 40/30 |
| 9,858,292 B1* | 1/2018 | Setlur | G06F 16/248 |
| 10,142,276 B2* | 11/2018 | Rapaport | H04L 51/32 |
| 10,331,788 B2* | 6/2019 | McAteer | G06F 40/30 |
| 10,546,235 B2* | 1/2020 | Moudy | G06N 3/0445 |
| 2014/0358519 A1* | 12/2014 | Mirkin | G06F 40/51 |
| | | | 704/3 |
| 2018/0018573 A1 | 1/2018 | Henderson et al. | |
| 2018/0121468 A1 | 5/2018 | Setlur et al. | |
| 2018/0181837 A1 | 6/2018 | Gorelick et al. | |

OTHER PUBLICATIONS

Kiela, Douwe, et al., "Exploiting image generality for lexical entailment detection," Proceedings of the 53rd Annual Meeting of the Association for Computational Linguistics and the 7th International Joint Conference on Natural Language Processing (vol. 2: Short Papers), 2015, pp. 119-124, vol. 2.

Mikolov, Tomas, et al., "Distributed representations of words and phrases and their compositionality," Advances in neural information processing systems, 2013, pp. 3111-3119.

Anonymous, "Visual Objects as Context: Exploiting Visual Objects for Lexical Entailment," AAAI Press, 2019, 8 pages.

* cited by examiner

FINDING OF ASYMMETRIC RELATION BETWEEN WORDS

BACKGROUND

The present disclosure, generally, relates to finding of semantic relations, more particularly, to a technique of finding an asymmetric relation between words.

Recognizing asymmetric relation such as lexical entailment is helpful for various natural language processing (NLP) tasks, including textual entailment recognition, taxonomy creation, natural language inference, etc. Lexical entailment defines an asymmetric relation between two words, in which one word can be inferred by another word but not vice versa, as exemplified in paired words "dog" and "animal".

There has been a technique that leverages features obtained from images, which are usually extracted from a middle layer of a Convolutional Neural Network (CNN).

SUMMARY

According to an embodiment of the present invention, a computer-implemented method is described for finding an asymmetric relation between a plurality of target words. The method includes preparing a plurality of image sets, each of which includes one or more images relevant to a corresponding one of the plurality of the target words. The method also includes obtaining a plurality of object labels for each of the plurality of image sets. The method includes further computing a representation for each of the plurality of the target words using the plurality of the object labels obtained for each of the plurality of image sets. The method further includes determining whether there is an asymmetric relation between the plurality of the target words using representations computed for the plurality of the target words.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for finding an asymmetric relation between target words by leveraging visual object labels obtained for the target words based on visual object recognition, in which the asymmetric relation to be found is a lexical entailment that one of the target words can be inferred by other of the target words but not vice versa.

Hereinafter, first referring to FIG. 1, a computer system for finding lexical entailments between paired target words in a given collection to build a hypernym-hyponym dictionary according to an exemplary embodiment of the present invention will be described. Then, referring to FIG. 2 together with FIGS. 3 and 4, a method for finding a lexical entailment between paired target words according to an exemplary embodiment of the present invention will be described. Then, with reference to FIG. 5A and FIG. 5B, experimental studies on the novel lexical entailment recognition according to the exemplary embodiment of the present invention will be described. Finally, referring to FIG. 6, a hardware configuration of a computer system according to one or more embodiments of the present invention will be described.

Figure 1:
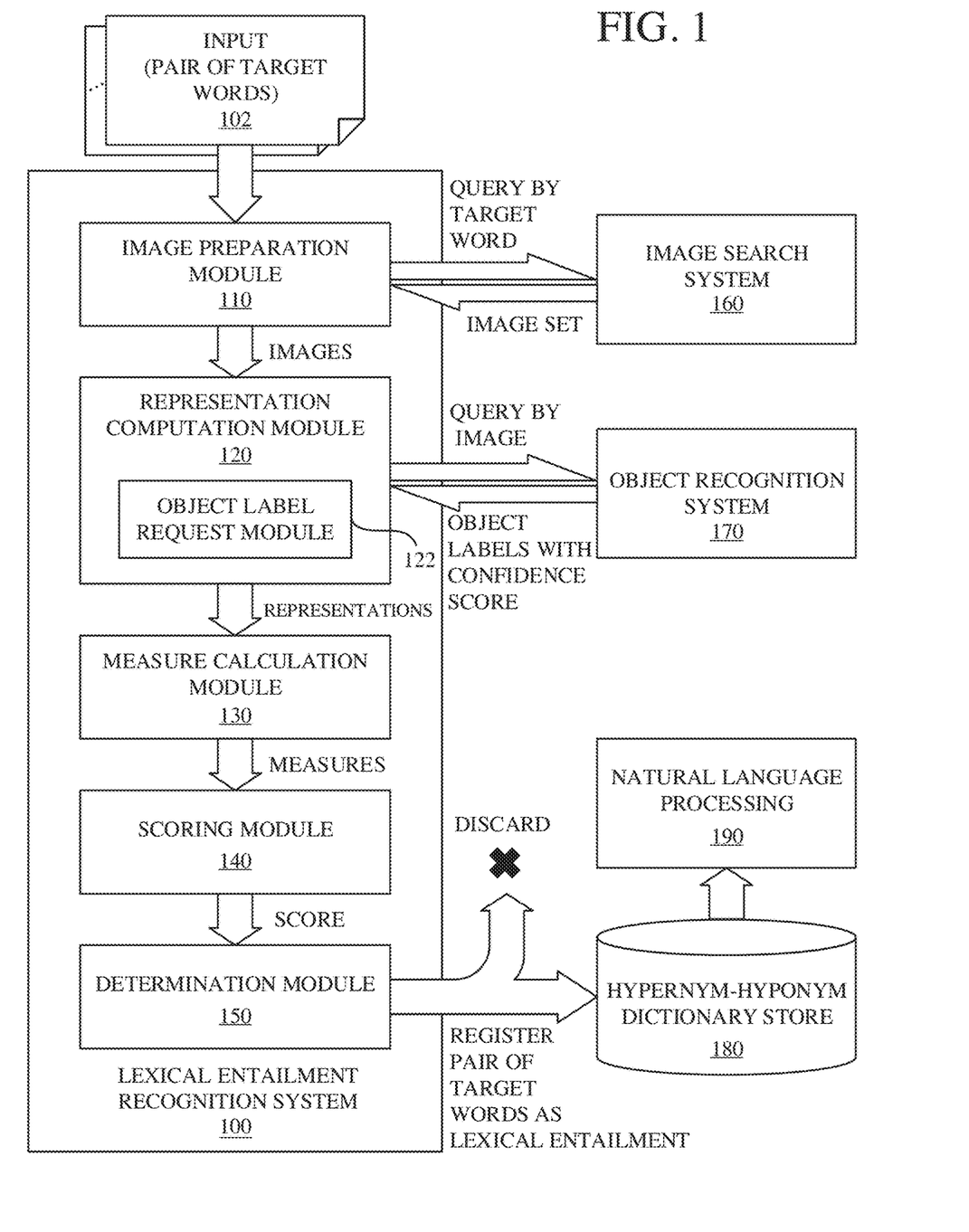
FIG. 1 illustrates a block diagram of a lexical entailment recognition system for finding a lexical entailment between paired target words according to an exemplary embodiment of the present invention.

Referring to FIG. 1, a block diagram of a lexical entailment recognition system 100 according to an exemplary embodiment of the present invention is described.

The lexical entailment recognition system 100 is configured to find lexical entailments from a collection of inputs 102 by leveraging visual object labels that can be obtained for the inputs 102 based on visual object recognition so as to build a hypernym-hyponym dictionary.

The collection of the inputs 102 are given to the lexical entailment recognition system 100. Each input 102 includes a pair of target words, each of which is independently a single word or multiple words (e.g., a phrase, a hyphenated compound), in a wide variety of languages, including English, Japanese, German, Italian, Spanish, Indonesian, Finnish, Bulgarian, Hebrew, Korean, Chinese, to name but a few. The target word can be any part of speech (e.g., nouns, verbs, etc.). In a particular embodiment, the inputs 102 can be subjected to preprocessing so as to exclude word pairs that are known to have no lexical entailment (e.g., a pair of "animal" and "pencil") or extract word pairs with possibilities of having lexical entailment to some extent, based on existing techniques.

In FIG. 1, several peripheral components around the lexical entailment recognition system 100 are also illustrated. There is an image search system 160 for retrieving one or more images matched with a given query. There is an object recognition system 170 for recognizing one or more visual objects captured in a given query image.

The lexical entailment recognition system 100 is configured to cooperate with the image search system 160 and the object recognition system 170 to perform novel lexical entailment recognition for each given input 102.

The image search system 160 is configured to retrieve one or more images matched with a given query. The image search system 160 can store indices of a large collection of images that are located over a worldwide computer network (e.g., internet), an internal computer network (e.g., LAN) and/or are accumulated on a specific service such as social networking services. The image search system 160 can store a relation between an image and keywords extracted from a text associated with the corresponding image. The query for the image search system 160 can be a string-based query.

The image search system 160 can receive a query from the lexical entailment recognition system 100, retrieve one or more images matched with the received query and return an image search result to the lexical entailment recognition system 100. The image search result can include image data of each image and/or a link to each image. The image search result can further include a relevance score, a rank or a rating of each image.

The image search system 160 can be an internal system of the lexical entailment recognition system 100 or an external service provided by a particular organization or an individual through an appropriate application programming interface (API). Such external service can include search engine services, social networking service, to name but a few. The number of the images in the image search result for a query may or may not be limited in accordance with a specific configuration of the image search system 160 or a query parameter.

The object recognition system 170 is configured to classify a visual object captured in an image of a given query. The object recognition system 170 can receive a query from the lexical entailment recognition system 100, perform visual object recognition to identify one or more visual object labels appropriate for the image of the query and return an object recognition result to the lexical entailment recognition system 100. The query for the object recognition system 170 can include image data of the image or a link to the image.

The object recognition result can include one or more object labels identified for the image of the query. In a particular embodiment, the object recognition result can have a confidence score given to each object label. The number of the object labels in the object recognition result can or may not be limited in accordance with a specific configuration of the object recognition system 170 or a query parameter. The total number of different object labels that the object recognition system 170 can distinguish can also depend upon the specific configuration of the object recognition system 170. In a preferable embodiment, an object recognition system capable of distinguishing 5000 or more different visual objects, more preferably 10000 or more different visual objects, is employed as the object recognition system 170.

The object recognition, which is a process of classifying a visual object captured in an image into predetermined categories, can be performed by using any known object recognition/detection techniques. In a particular embodiment, the object recognition system 170 can include an ANN (Artificial Neural Network) such as CNN (Convolutional Neural Network) and DNN (Deep Neural Network). The object recognition system 170 can be an internal system of the lexical entailment recognition system 100 or an external service that can be provided by a particular organization or an individual through an appropriate API.

In FIG. 1, there is further a hypernym-hyponym dictionary store 180 for storing hypernym-hyponym relations (a subordinate word or hyponym (e.g., "dog") entails a superordinate word or hypernym (e.g., "animal") but not vice versa, thus the pair of the hypernym and the hyponym can be said to have a lexical entailment) recognized by the lexical entailment recognition system 100. Upon finding the lexical entailment between the target words in the given input 102, the lexical entailment recognition system 100 can register the pair of the target words in the given input 102, as a hypernym-hyponym relation, into the hypernym-hyponym dictionary store 180. When the given pair of the target words has been already registered in the hypernym-hyponym dictionary store 180, overlapping registration can be omitted.

The hypernym-hyponym dictionary store 180 is configured to store a hypernym-hyponym dictionary that holds hypernym-hyponym relations recognized by the lexical entailment recognition system 100. The hypernym-hyponym dictionary store 180 can be provided by using any internal or external storage device or medium that the system 100 can access.

In FIG. 1, a more detailed block diagram of the lexical entailment recognition system 100 is also depicted. As shown in FIG. 1, the lexical entailment recognition system 100 includes an image preparation module 110 for preparing an image set for each target word in the given input 102; a presentation computation module 120 for computing a representation of each target word in the given input 102; a measure calculation module 130 for calculating a measure for each target word in the given input 102; a scoring module 140 for evaluating a score for the pair of the target words in the given input 102; and a determination module 150 for determining whether or not there is a lexical entailment between the two target words in the input 102 based on the evaluated score.

The image preparation module 110 is configured to prepare a plurality of image sets, each of which corresponds to one target word in the given input 102 and includes one or more images relevant to the corresponding target word, by using the image search system 160. Each image set is prepared by retrieving one or more images with the corresponding target word (e.g., a string) as a query for the image search system 160. The number of the images to be retained in each image set can be limited to a predetermined number (L), thus, each image set includes the L most relevant images for the corresponding target word.

The presentation computation module 120 is configured to compute a representation for each target word in the give input 102. The presentation computation module 120 can include an object label request module 122 configured to obtain a plurality of object labels for each image set (e.g., each target word) by requesting visual object recognition with the one or more images in each image set as queries for the object recognition system 170.

The number of the object labels retained for each image can be limited to a predetermined number (M). Thus, the number of the object labels obtained for each image set (e.g., each target word) is L×M at most. However, since a fixed number of object labels are not always returned and the returned labels can overlap, the number of the unique object labels obtained for each image set (e.g., each target word) can differ from the maximum value L×M. The representation of each target word can be computed as a histogram vector based on the object labels obtained for the corresponding image set.

The histogram vector has a plurality of elements corresponding to the plurality of the different object labels. In one or more embodiments, each element of the histogram vector stores a statistic (e.g., average (frequency), max, means & standard deviation) of occurrence of each object label when the object recognition result has merely object labels and does not has a confidence score given to each object label or when ignoring the confidence score given to each object label (frequency weighting). In one or more other embodiments, each element of the histogram vector stores a statistic (e.g., average, max, means & standard deviation) in relation to a confidence scores associated with each object label when the confidence score given to each object label is available (score weighting).

In a particular embodiment, each element of the histogram vector stores an average of confidence scores associated with each object label when the confidence score given to each object label is available. In further other particular embodiment, each element of the histogram vector stores the maximum of the confidence scores associated with each object label. In further other particular embodiment, each element of the histogram vector stores means or standard deviation of the confidence scores associated with each object label (means and standard deviation are calculated for each object label and then concatenated, thus the resulting vector is double in size).

In further other embodiment, the representation of each target word can be computed as a matrix having respective representation vectors for the images, in which the representation vector has a plurality of elements storing the existence or the confidence score of each object label, instead of computing the histogram vector.

The measure calculation module 130 is configured to calculate a measure for each target word in the input 102 using the representation computed for the corresponding one of the target words. In the described embodiment, the measure represents informativeness of each target word and is calculated by using a predetermined informativeness function. The informativeness function measures how informative the target word is. The informativeness is a hypernymy measure to quantify extent of hypernymy of a target word.

In the described embodiment, the informativeness can be quantified as entropy of the representation and a general formula of the entropy can be used as the informativeness function. The measure can be calculated from the whole (all elements) or a part (e.g., N highest elements) of the representation. Hereinafter, the measure representing the informativeness of the target word is employed and referred to as an informativeness score.

The informativeness score is preferable as the measure for finding the lexical entailment between the target words since Distributional Informativeness Hypothesis (DIH) would hold in visual objects even though narrower words tend to be associated with narrower visual objects (e.g., the word "cat" is likely to be associated with the visual object (labels) such as "tabby cat" or "kitty-cat"), which are less likely to co-occur with a broader word (animal), which generally makes it hard to follow with the Distributional Inclusion Hypothesis or RCTC (Ratio of Change in Topic Coherence) and causes performance degradation.

Also the entropy of the representation is preferable as the informativeness function in a view point of performance. However, in other embodiments, other measures can also be contemplated. In other embodiment where the representation of each target word is computed as the matrix with the representation vector for each image, an average cosine distance between all pairs of the representation vectors or an average cosine distance of the representation vectors to the centroid can be used as the measure.

The scoring module 140 is configured to evaluate a score for the pair of the target words in the given input 102 based on the informativeness scores calculated for the paired target words. Hereinafter, the score calculated for the pair is referred to as a hypernym-hyponym score. The hypernym-hyponym score represents the directionality of the asymmetric relation given two target words. In one or more embodiments, the hypernym-hyponym score is quantified by a difference in the informativeness between the paired target words and is calculated by using a predetermined score function. In a particular embodiment, the difference is quantified by a ratio of the informativeness of one target word to other target word (also referred to as "SLQS_ratio"). In other embodiment, the difference is quantified by a result of subtracting the informativeness of one target word from the informativeness of other target word (also referred to as "SLQS_sub").

The determination module 150 is configured to determine whether or not there is a lexical entailment between the paired target words in the input 102 by using the hypernym-hyponym score that is calculated by the scoring module 140 from the paired informativeness scores for the paired target words. Upon determining that there is a lexical entailment, the determination module 150 registers the pair of the target words of the given input 102, as a hypernym-hyponym relation, into the hypernym-hyponym dictionary store 180. On the other hand, if there is no lexical entailment, the determination module 150 can discard the result of the given input 102.

In one or more embodiments, the determination module 150 can perform a detection of existence of a lexical entailment and/or a determination of a direction of the lexical entailment (a determination as to which target word is considered as a hypernym). In a preferable embodiment, the directionality of the lexical entailment is determined based on the hypernym-hyponym score calculated for the pair of the target words in addition to the detection of the existence of the lexical entailment.

By performing aforementioned processing repeatedly for each input 102 in the given collection, the hypernym-hyponym dictionary would be built with the hypernym and hyponym relations determined by the determination module 150.

As shown in FIG. 1, there can be a natural language processing system 190 for performing a natural language task by using the hypernym-hyponym dictionary built by the lexical entailment recognition system 100. Such natural language task performed by the natural language processing system 190 can include textual entailment recognition, taxonomy creation, natural language inference, metaphor detection, to name but a few. Since a lot of hypernym and hyponym relations are registered in the hypernym-hyponym dictionary store 180, performance of the natural language task is expected to be improved. Also extent of applications of the natural language task is expected to be expanded.

In particular embodiments, each of systems 100, 160, 170 and 190 described in FIG. 1 and each of modules 110, 120, 122, 130, 140 and 150 of the lexical entailment recognition system 100 can be implemented as, but not limited to, a software module including instructions and/or data structures in conjunction with hardware components such as a processor, a memory, etc.; a hardware module including electronic circuitry; or a combination thereof. These systems 100, 160, 170 and 190 and these modules 110, 120, 122, 130, 140 and 150 described in FIG. 1 can be implemented on a single computer system such as a personal computer, a server machine, or over a plurality of devices such as a client server system, an edge computing system, a computer cluster in a distributed manner.

Hereinafter, referring to a flowchart shown in FIG. 2 together with schematics shown in FIG. 3 and FIG. 4, a process for finding a lexical entailment between given paired target words by leveraging visual object labels according to an exemplary embodiment of the present invention is described.

Figure 2:
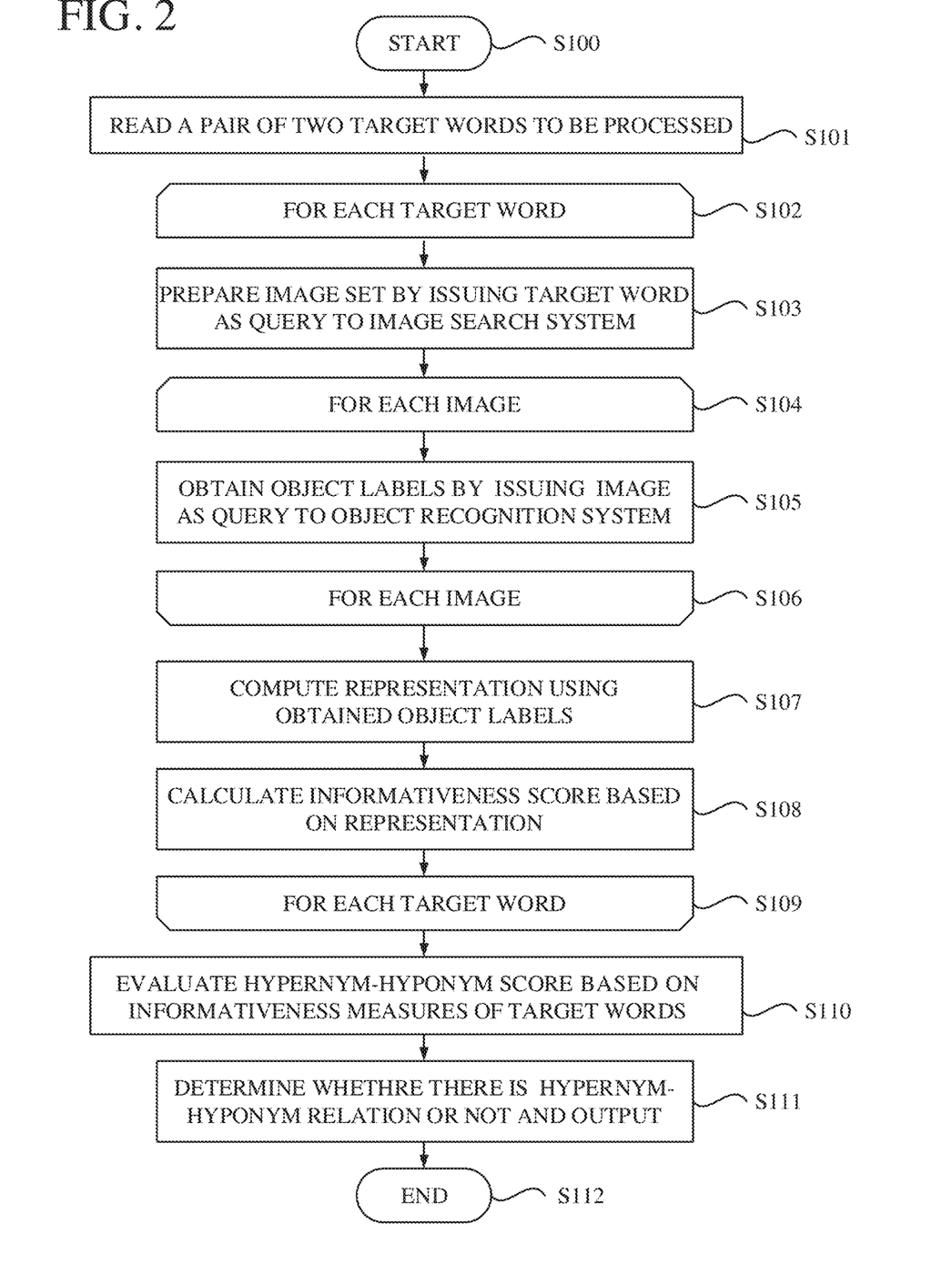
FIG. 2 is a flowchart depicting a process for finding a lexical entailment between paired target words according to an exemplary embodiment of the present invention.

Note that the process shown in FIG. 2 can be executed by the lexical entailment recognition system, e.g., a processing unit that implements the lexical entailment recognition system 100 shown in FIG. 1. The process shown in FIG. 2 can begin at block S100 in response to receiving, from an operator, a request for processing a pair of two target words. Note that the process shown in FIG. 2 can be repeatedly performed for each pair of target words given in a correction.

At block S101, the processing unit can read a pair of two target words to be processed.

A loop from block S102 to block S109 is repeatedly executed for each target word in the given pair. At block S103, the processing unit can prepare, by the image preparation module 110, an image set by issuing a string of each target word as a query to the image search system 160.

A loop from block S104 to block S106 is repeatedly executed for each image in the image set obtained at block S103. At block S105, the processing unit can obtain, by the object label request module 122, one or more object labels by issuing each image as a query to the object recognition system 170.

Figure 3:
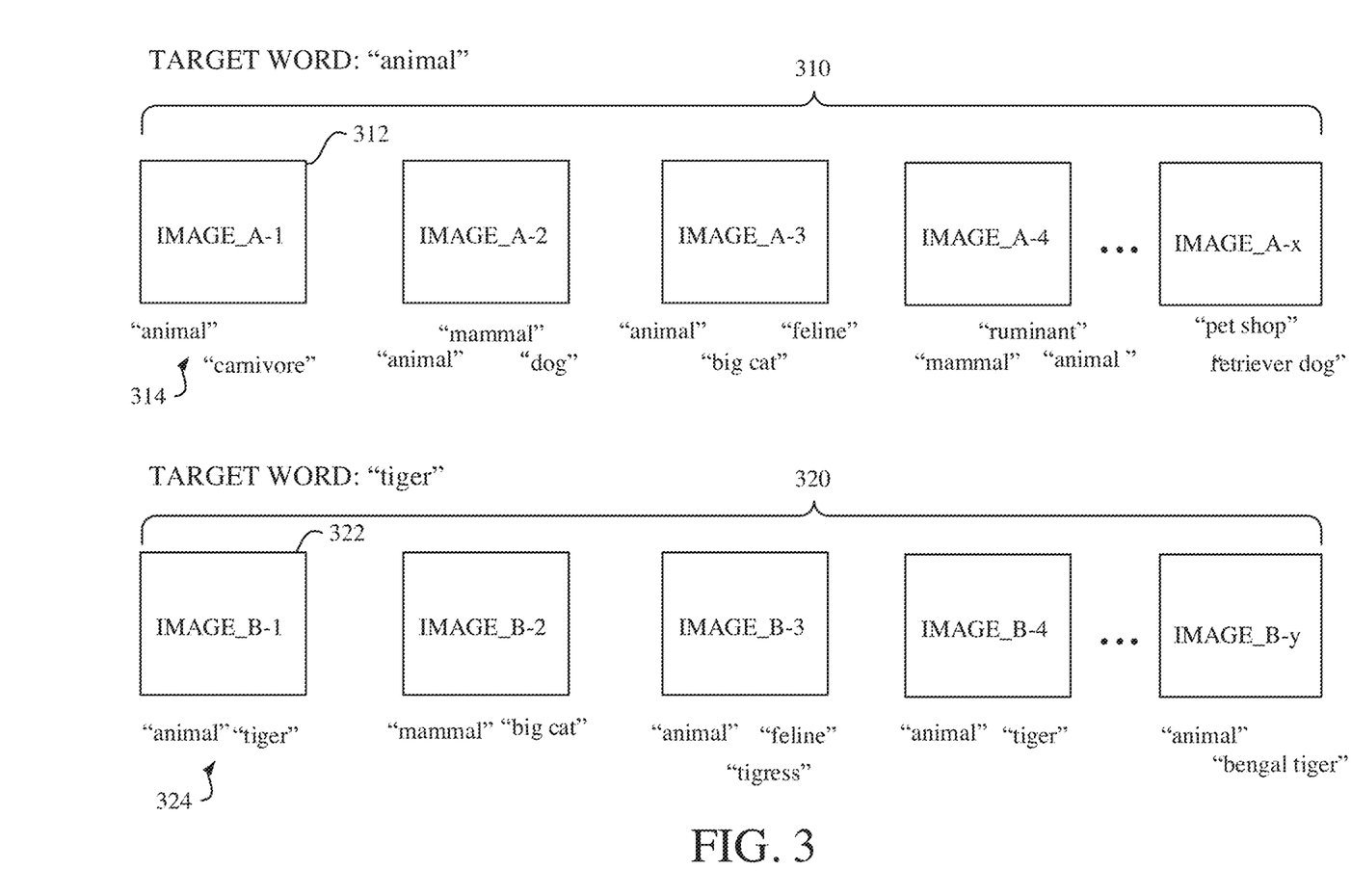
FIG. 3 describes a schematic of a way of obtaining object labels for each target word in the process according to the exemplary embodiment of the present invention.

FIG. 3 describes a schematic of a way of obtaining object labels for each target word in the process. As shown in FIG. 3, there is a first image set 310 including a plurality of images 312 (IMAGE_A-1~IMAGE_A-x) for a target word "animal", in which each image 312 is associated with one or more object labels 314 (e.g., "animal", "carnivore"). There is also a second image set 320 including a plurality of images 322 (IMAGE_B-1~IMAGE_B-y) for a target word "tiger", each of which is associated with one or more object labels 324 (e.g., "animal", "tiger"). The number of the images obtained for one target word can be or may not be the same as the number of the images obtained for other target word. The number of the object labels obtained for one image can be or may not be the same as the number of the object labels obtained for other image. In the described embodiment, the number of the images obtained for each target word is limited to a predetermined number (L) and the number of the object labels obtained for each image is limited to a predetermined number (M).

As illustrated in FIG. 3, an object label associated with one image may or may not overlap with that of other image within the same image set. Also, any object label obtained for one target word may or may not appear in a set of object labels obtained for other target word. The total number of the different object labels obtained for one target word can be the same as or different from the total number of the different object labels obtained for other target word.

Referring back to FIG. 2, at block S107, the processing unit can compute, by the presentation computation module 120, a representation for each target word using the object labels obtained through the loop from block S104 to block S106. In the described embodiment, the representation of the target word is computed as a histogram vector. The histogram vector has a plurality of elements corresponding to the different object labels.

Figure 4:
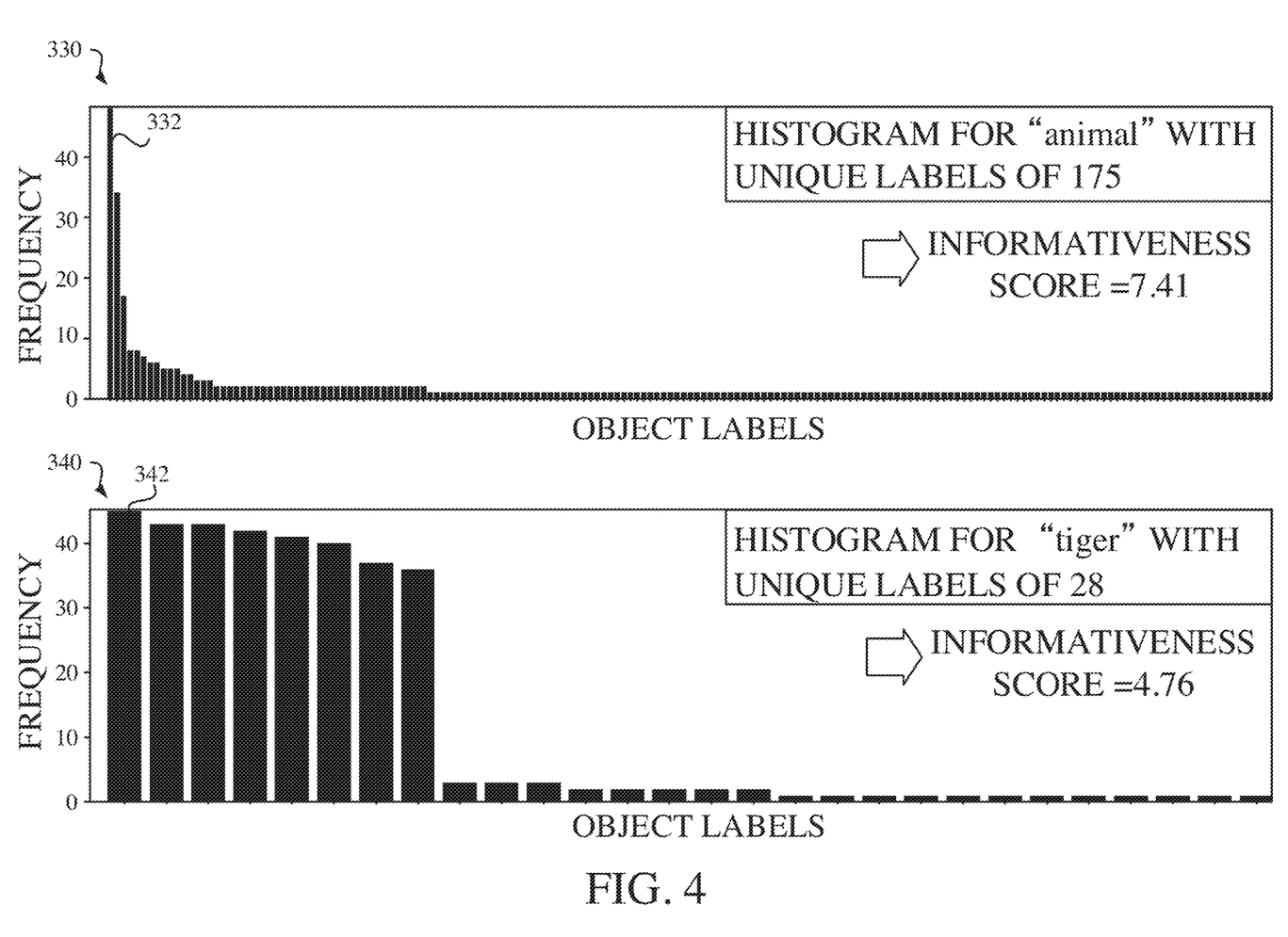
FIG. 4 describes schematics of examples of histograms obtained for examples of target words according to a particular embodiment of the present invention.

FIG. 4 shows examples of histograms 330, 340 that were experimentally obtained for examples of target words "animal" and "tiger". Each bar 332/342 (x-axis) corresponds to different object label. Note that the histograms 330, 340 shown in FIG. 4 are based on the frequency weighting and indicates the number of the occurrence (or frequency) of the corresponding object label.

As shown in FIG. 4, the number of the unique labels obtained for the target word "animal" (175) is larger than the number of the unique labels obtained for the target word "tiger" (28). The distribution for the broader word "animal" tends to be more long-tailed than the narrower word "tiger". It gives us an interesting insight that the broader the concept, the more long-tailed the histogram.

Referring back to FIG. 2, at block S108, the processing unit can calculate, by the measure calculation module 130, an informativeness score for each target word based on the representation of the corresponding target word. In the described embodiment, the informativeness score for the target word is calculated as entropy f(v) of a given histogram vector v, as follows:

$$f(v) = \sum_{i}^{D} p(v_i) \log_2 p(v_i),$$

$$\text{where } v \in R^D \text{ and } p(v_i) = \frac{v_i}{\|v\|}.$$

In the aforementioned equation, $p(v_i)$ indicates a probability distribution for i-th element of the histogram vector v and $\|v\|$ is the length of the histogram vector v. Note that in a particular embodiment N highest elements of the histogram vector v can be used for summation instead of using D elements of the histogram vector v and the negative values and zero values can be ignored. The entropy can be calculated independently for each target word regardless of obtained specific object labels. In a particular embodiment, any normalization, including but not limited to, L2-normalization, min-max normalization and z-score normalization, can be applied to the representation to calculate the entropy for each word if necessary.

From the definition, the entropy gets higher as the vector v has a larger number of smaller values, that is, long-tailed distribution or as it gets closer to the uniform distribution in the case of the same number of positive values. Consequently, the broader word is likely less informative (e.g., higher entropy) because it relates a variety of images, thus, the distribution of the broader word is more long-tailed than the narrower word.

The informativeness scores calculated for the target words "animal" and "tiger" are also shown in FIG. 4. As shown in FIG. 4, the histogram 330 of the broader word "animal" showed long-tailed distribution over the 175 unique labels and the informativeness score was calculated to be a larger value (7.41). The histogram 340 of the narrower word "tiger" showed more short-tailed distribution over the 28 unique labels and the informativeness score was calculated to be a smaller value (4.76).

Referring back to FIG. 2, in response to the processing from block S103 to block S108 being executed for every target word in the given pair, the process can exit the loop of steps S102-S109 and proceed to block S110.

At block S110, the processing unit can evaluate, by the scoring module 140, a hypernym-hyponym score for the pair based on the two informativeness scores calculated for the two target words.

In a particular embodiment, the hypernym-hyponym score s (x, y) is quantified by a ratio of the informativeness of one target word x to other target word y and the hypernym hyponym score s (x, y) is calculated as follows:

$$s(x, y) = 1 - \frac{f(v_x)}{f(v_y)}.$$

where $v_x$ and $v_y$ are the representations of the target word x and the target word y, respectively.

In other particular embodiment, the hypernym-hyponym score is quantified by a result of subtracting the informativeness of one target word x from the informativeness of other target word y, and the hypernym hyponym score s (x, y) is calculated as follows:

$$s(x,y)=f(v_y)-f(v_x).$$

The both above score functions become positive if the target word y is a hypernym of the target word x.

At block S111, the processing unit can determine, by the determination module 150, whether or not there is a lexical relationship between the two target words in the given pair based on the hypernym-hyponym score and output the result.

In the described embodiment, in order to perform the determination, two thresholds $A_{rel}$ and $A_{hyp}$ are introduced to classify the pair of the target words into the following classes with the following discriminant function:
- no-relation: not in hypernym-hyponym relation if $|s(x,y)| < A_{rel}$,
- hypernym: y is a hypernym of x if $|s(x,y)| > A_{rel}$ and if $s(x,y) > A_{hyp}$,
- reversed hypernym: x is a hypernym of y if $|s(x,y)| > A_{rel}$ and if $s(x,y) < A_{hyp}$.

These two thresholds $A_{rel}$ and $A_{hyp}$ can be set empirically or can be optimized, in advance, by using a collection of training samples, each of which includes a paired words and an associated correct label (e. g., no-relation, hypernym, reversed hypernym).

However, a way of determining the existence and the directionality of the lexical entailment with the hypernym-hyponym score is not limited to the specific embodiment with the aforementioned discriminant function. In other embodiment, the obtained hypernym-hyponym score can be used as a feature in combination with other existing features (e.g., features of word embedding, features of text-based DIH) for possibly more complicated classification model.

At block S112, the processing unit can end the process.

According to one or more embodiments of the present invention, a novel technology capable of finding an asymmetric relation such as lexical entailment between give target words with high accuracy is provided.

Since the visual object labels obtained for the given target word are leveraged to determine whether or not the given pair of the target word has the lexical entailment, it is possible to detect lexical entailments that the conventional text-based methods fail to predict, as demonstrated in the experimental results described later. The accuracy of the recognition can be improved in comparison with text-based methods.

Since the discrete visual object labels are used to form the representation of the target word, which are sparser than the conventional CNN-derived high-dimensional continuous representation extracted from a middle layer in the CNN, the representation of the target word can be lightweight in comparison with the conventional CNN-derived representation in data size.

In the aforementioned embodiments, the hypernym-hyponym score is calculated from the representations computed for the target words and used to determine the existence and the directionality of the lexical entailment, as a form of using of the representations. However, in one or more other embodiments, the representations computed for the target words are expected to be more directly usable to determine the existence and the directionality of the lexical entailment. The obtained original representations for the target words or the informativeness measures calculated for the target words from the representations can be used as features solely or in combination with other existing features (e.g., features of word embedding, features of text-based DIH) for possibly more complicated classification model of discriminating the hypernym and hyponym relation.

Experimental Studies

Experiment I (Classification Task of Detection and/or Directionality of Hypernym)

As for Example 1, a program implementing the process shown in FIG. 2 according to the exemplary embodiment was coded and executed for each target word pair in three datasets that measure different aspects of lexical entailment.

The first dataset is referred to as BLESS dataset. The BLESS dataset aims to evaluate directionality of hypernymy. The BLESS dataset includes 1,337 word pairs that are all in hypernym relation, as in "tiger"-"animal" and "tiger"-"carnivore", where the latter is always a hypernym of the former. Thus, it is required to assign a positive score based on the aforementioned definitions of the hypernym hyponym score s (x, y), which means that the latter word is less informative (e.g., more general).

The second dataset, WBLESS dataset, stores 1, 668 word pairs and aims to measure the capability of the detection of the hypernym. In the WBLESS dataset, it is expected that the novel lexical entailment recognition appropriately distinguishes word pairs in hypernym relations from others: namely, holonymy-meronymy (e.g., tiger-jaw), co-hyponymy (e.g., tiger-bull), reversed hypernym (e.g., vertebrate-tiger), or no relation (e.g., tiger-maneuver).

The third dataset, BIBLESS dataset, includes the same word pairs as the WBLESS dataset, but word pairs in reversed hypernym relation are marked as another category. Therefore, it is expected that the novel lexical entailment recognition detects whether the word pair has a hypernym relation or not and which word is the hypernym.

Two thresholds $A_{rel}$, $A_{hyp}$ were used in the aforementioned discriminant function when evaluating on the WBLESS and BIBLESS datasets. The thresholds $A_{rel}$, $A_{hyp}$ were tuned with 2% of the dataset and evaluated the novel functionality on the remaining 98% of the dataset. The procedure including the threshold tuning and the evaluation was repeated 1,000 times and the average accuracy was reported. In the BLESS dataset, the thresholds $A_{rel}$ and $A_{hyp}$ were set to zero.

Images were collected by using Google™ Images Search as the image search system 160 from Jul. 10 to Jul. 25, 2018. The L (L=50 otherwise indicated) most relevant images was prepared for each word. For each image, the IBM Watson™ Visual Recognition API (hereinafter called "Watson™ VR") was applied, as the object recognition system 170, to obtain the object information in the image. The API returned up to the ten most confident object labels (M=10) with their corresponding confidence scores. In the preliminary experiment, it was found that Watson™ VR is capable of distinguishing at least 13 k different objects, which is much higher than the number of the objects that can be predicted by well-known, publicly available, pre-trained CNN models. The histograms shown in FIG. 4 are the resulting histograms of the Watson™ VR (L=50, M=10).

The informativeness measure was employed and the entropy was used to quantify the informativeness. The average of the confidence scores associated with each object label was used to form the histogram vector in all three datasets (e.g., score weighting). The informativeness measure was calculated using all the elements of the representation. The normalization was applied to the representation to calculate the entropy for each word. L2-normalization was used for the BLESS dataset. The z-score normalization was used for the WBLESS and the BIBLESS datasets. Both SLQS_ratio and SLQS_sub score functions were examined.

As for Comparative Example 1, a conventional CNN-based representation was also investigated for the same three datasets. The recently proposed DenseNet having 161-layers was used as the CNN model. Visual representations were extracted from the final fully-connected activation layer (not a last output layer) in the CNN model. The resulting representation forms a 2208-dimensional vector. PyTorch was used for extraction and the torchvision package was used to obtain pre-trained CNN models. The CNN model was trained on ILSVRC (Large Scale Visual Recognition Challenge) 2012 classification dataset, which has 1.2 M images from 1000 classes. In order to allow us to make the results comparable, the CNN-based representation was constrained to have up to the highest ten values in the representation of an image.

The trained CNN model showed Top-1 error rate of 22.35% and Top-5 error rate of 6.20% on ImageNet 1k-class validation set. The same image sets used in the novel lexical entailment recognition were used to obtain the conventional CNN-based representation. The score weighting and the frequency weighting were both examined to form the representation depending on the datasets. Appropriate normalizations were applied to the representation to calculate the entropy for each word depending on the datasets. Both SLQS_ratio and SLQS_sub score functions were examined.

As for Comparative Example 2, a word embedding, that is Skip-gram with negative sampling trained on part of Google News dataset (about 100 billion words) was also investigated. The embedding represented in 300-dimensional vector was used.

The experimental results were summarized in the following Table 1. In the following Table 1, the result of the original literature of DIH based representation is also added as the baseline (Comparative Example 3). The DIH-based representation is defined by median entropy of the d most associated contexts of the word. In the original literature, 2.7 billion word corpora was used to get the DIH based representation.

TABLE 1

|  | BLESS | WBLESS | BIBLESS |
|---|---|---|---|
| Example 1 | 0.935** | 0.775(0.03)*** | 0.602(0.03)*** |
| Comparative Example 1 (CNN based method) | 0.914# | 0.766(0.03)## | 0.601(0.03)### |
| Comparative Example 2 (Skip-Gram) | 0.714+ | 0.592(0.04)++ | 0.491(0.02)+++ |
| Comparative Example 3 (DIH based Baseline) | 0.87* | N/A | N/A |

The standard deviation is shown in the parenthesis.
*The accuracy is taken from the original papers.
**Both score functions (SLQS_ratio, SLQS_sub) showed best performance in the case where the L2 normalization was used.
***The SLQS_ratio score function showed best performance in the case where the z-score normalization was applied.
Both score functions showed the best performance in both the case where normalization was not applied and the case where z-score normalization was applied. Each element of the representation stored the maximum of the confidence scores associated with the corresponding label.
The SLQS_ratio score function showed the best performance regardless of the normalization (L2, min-max, and z-score). Each element of the representation stored the average of the occurrence of the corresponding label.
The SLQS_sub score function showed the best performance regardless of the normalization. Each element of the representation stored a mean or a standard deviation of the occurrence of the corresponding label.
+Both score functions showed the best performance in the case where the min-max normalization was applied. Both the score weighting and the frequency weighting were examined.
++The SLQS_sub score function showed the best performance. The min-max normalization was applied. Both the score weighting and the frequency weighting were examined.
+++The SLQS_ratio score function showed the best performance in both the case where normalization was not applied and the case where L2 normalization was applied.

Overall, the novel lexical entailment recognition outperformed all comparative examples (Comparative Examples 1 and 2) and the baseline (Comparative Example 3) in all datasets, especially outperformed the text-based method (Comparative Examples 2 and 3) by a large margin. It implies that the DIH holds in the novel lexical entailment recognition better than in the others.

By taking a closer look at the configurations achieved the best results, the novel lexical entailment recognition consistently preferred the entropy as the measure. Note that the novel lexical entailment recognition performed well with the confidence scores aggregated by the average in all datasets while the normalization varied.

Experiment II (Effect of the Number of Images and Dimensions)

Two factors that can potentially affect the performance of the novel lexical entailment recognition were also inspected: that is the number of images for each target word, L, and the number of dimensions of the representation used to calculate the entropy, N.

Number of Images L

As for Example 2, the optimal configuration that achieved the best performance in the aforementioned Experiment I was used. The BIBLESS dataset was examined. It is assumed that more images yield a better performance. To confirm this assumption, an experiment varying the number of the images was conducted.

Figure 5A:
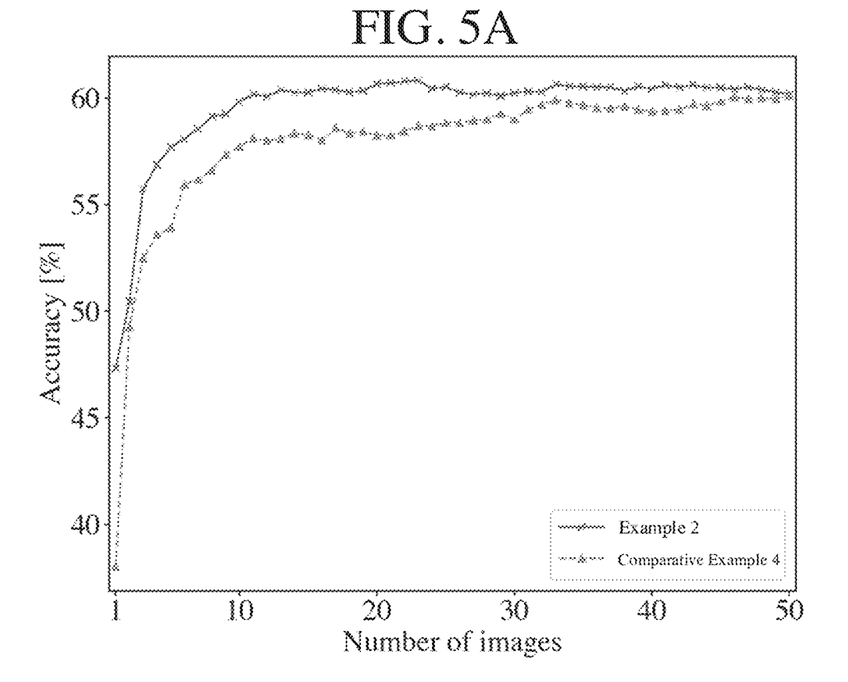
FIG. 5A shows an effect of the number of images used to calculate informativeness according to the exemplary embodiment of the present invention.

FIG. 5A shows an effect of the number of the images used to calculate informativeness. FIG. 5A compares the results between the novel lexical entailment recognition (Example 2) and the conventional CNN-based method (Comparative Example 4). As shown in FIG. 5A, both methods got saturated in a relatively smaller number of images; that is, around 10-20. Also both methods did not decrease their performance even if the number of images increased. Besides, the novel lexical entailment recognition (Example 2) consistently outperformed the conventional CNN-based method (Comparative Example 4) when any number of images was used.

Number of Dimensions N

As for Example 3, the optimal configuration that achieved the best performance in the aforementioned Experiment I was also used and the BIBLESS dataset was examined. A comparison experiments where the number of dimensions of the representations is restricted when calculating the entropy were conducted for the novel lexical entailment recognition (Example 3), a conventional CNN based method (Comparative Example 5), a fastText word embedding trained on the mixture of Wikipedia and Common Crawl with 300-dimensional vectors (Comparative Example 6). As for Example 4, last outputs of the DenseNet, which indicate the probability distribution of 1k-class objects, were used to form the representation. In Example 4, the entropy was also employed as the informativeness measure in order to compare with the Example 3.

Figure 5B:
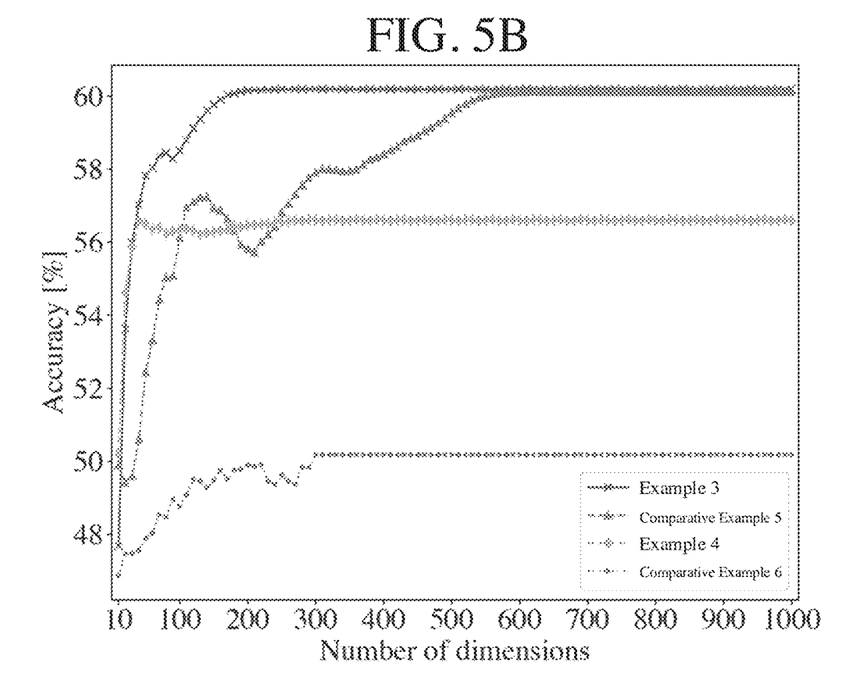
FIG. 5B shows an effect of the number of dimensions of the representation used to calculate the informativeness according to the exemplary embodiment of the present invention.

FIG. 5B shows an effect of the number of dimensions of the representation used to calculate the informativeness. FIG. 5B illustrates that the novel lexical entailment recognition (Example 3) achieves the best performance with around 200, which is much smaller than or equal to other representations shown in the graph. It reveals that the novel lexical entailment recognition (Example 3) has a strong capability of detection as well as directionality of hypernyms even if the number of unique objects is restricted to the small number. The difference of the performance between the Example 3 and Example 4 implies that the larger number of unique objects that the object recognition system can predict causes a further improvement.

Experiment III (Graded Lexical Entailment Task)

For a more fine-grained evaluation, another experiment for lexical entailment was conducted by using HyperLex. It measures the correlation between scores by a method and scores annotated by humans. A comparison experiments were conducted for the novel lexical entailment recognition (Example 5), a conventional CNN based method (Comparative Example 7), a fastText word embedding method (Comparative Example 8).

The dataset stores 2,616 word pairs, which also includes verb pairs (453 out of 2,616). Seven different relations are defined in the dataset; synonym, antonym, melonym-holonym, co-hypernym, hypernym, reversed hypernym, and no relation. The scores annotated by humans range from 0 to 10, which indicate that "to what degree is the former word a type of the latter word." A higher score is assigned with a word pair in hypernym relation (e.g., 9.85 for girl-person) while a lower score is assigned with a word pair of reversed hypernym relation (e.g., 3.03 for person-idol) and other relations.

The scores were calculated for each method by aforementioned score functions based on the best configurations obtained in the previous experiments, especially on the BIBLESS dataset. Using these scores, Spearman's rank correlation coefficient with the human-rated scores in HyperLex was computed. The experimental results were summarized in the following Table 2:

TABLE 2

| | All | Nouns | Verbs |
|---|---|---|---|
| Example 5 | 0.30 | 0.32 | 0.13 |
| Comparative Example 7 (CNN based method) | 0.26 | 0.28 | 0.08 |
| Comparative Example 8 (fastText) | 0.13 | 0.14 | 0.01 |

Similar to the previous experiments, the novel lexical entailment recognition (Example 5) outperformed both the CNN-based method (Comparative Example 7) and the word embedding (Comparative Example 8) in all combined datasets (All). It is notable that the further improvement of the novel lexical entailment recognition was obtained in the verb dataset (Verbs). It can be concluded that the representation of the novel lexical entailment recognition captures the nature of hypernym relation in word pairs better than the other previous representations.

Conclusion

It was demonstrated that the novel lexical entailment recognition outperformed both of the conventional CNN-based representations, the word embeddings and DIH based representations with various different lexical entailment datasets. It was experimentally confirmed that the Distributional Informativeness Hypothesis (DIH) holds in visual objects.

As described above, the DIH-based representation is defined by median entropy of the d most associated contexts of the word. When the noises in the corpus have negative influence on entropy of one context, any words that have the same context would be affected by this negative influence, which degrades the possibility that good representation is obtained. In contrast, in the present method, the quality of the image search result of one word does not affect the calculation of the representation for other word so that adverse effects can be minimized. This is considered to be the reason why the novel lexical entailment recognition outperformed the DIH based representation. Also, the reason why the novel lexical entailment recognition outperformed the word embedding is considered to be that there is no constrain on the extent of the meaning in the word embedding in the training, which is based on the distributional hypothesis with a weaker constraint that words appearing in a similar context have similar meanings.

It was also revealed that the novel lexical entailment recognition rapidly got saturated in around 200 dimensions (e.g., the number of unique object labels) compared to others. It suggests that the representation of the novel lexical entailment recognition can achieve enough informativeness even in such a smaller number of dimensions.

Since the discrete visual object labels are employed as the representation of the target word, which are sparser than the conventional CNN-derived high-dimensional continuous representation, the representation of the target word can be lightweight in comparison with the conventional CNN-derived representation in data size, achieving around 1.9% of a CNN-derived representation in data size. In a specific condition, for 685 words, the novel representation is around 5.4 MB (in pickle format in Python) whereas CNN-based representation is around 289 MB (in pickle format in Python).

Computer Hardware Component

Figure 6:
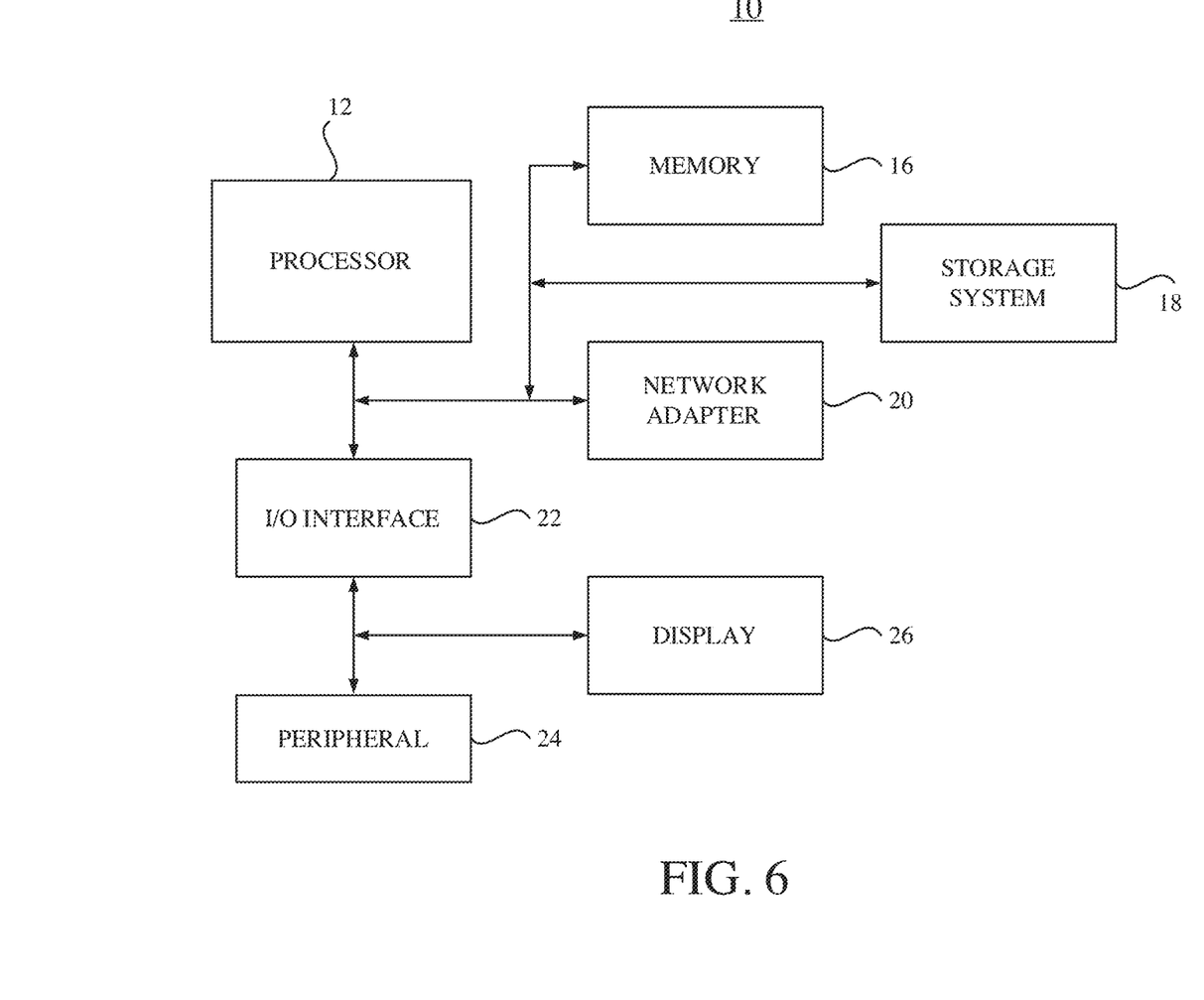
FIG. 6 depicts a computer system according to one or more embodiments of the present invention.

Referring now to FIG. 6, a schematic of an example of a computer system 10 is shown, which can be used for implementing the lexical entailment recognition system 100 shown in FIG. 1. The computer system 10 shown in FIG. 6 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that can be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 can be described in the general context of computer system-executable instructions, such as program modules, being executed by a computer system. Generally, program modules can include routines, programs, objects, components, logic, data structures, and so on that perform particular tasks or implement particular abstract data types.

As shown in FIG. 6, the computer system 10 is shown in the form of a general-purpose computing device. The components of the computer system 10 can include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media can be any available media that is accessible by the computer system 10, and it includes both volatile and non-volatile media, removable and non-removable media.

The memory 16 can include computer system readable media in the form of volatile memory, such as random access memory (RAM). The computer system 10 can further include other removable/non-removable, volatile/non-volatile computer system storage media. By way of example only, the storage system 18 can be provided for reading from and writing to a non-removable, non-volatile magnetic media. As will be further depicted and described below, the storage system 18 can include at least one program product having a set (e.g., at least one) of program modules that are configured to carry out the functions of embodiments of the invention.

Program/utility, having a set (at least one) of program modules, can be stored in the storage system 18 by way of example, and not limitation, as well as an operating system, one or more application programs, other program modules, and program data. Each of the operating system, one or more application programs, other program modules, and program data or some combination thereof, can include an implementation of a networking environment. Program modules generally carry out the functions and/or methodologies of embodiments of the invention as described herein.

The computer system 10 can also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention can be a computer system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for finding an asymmetric relation between a plurality of target words, the method comprising:
    preparing a plurality of image sets each including one or more images relevant to a corresponding one of the plurality of the target words, including retrieving the one or more images of each of the plurality of image sets with the corresponding one of the plurality of target words as a query for an image search system;
    obtaining a plurality of object labels for each of the plurality of image sets;
    computing a representation for each of the plurality of target words using the plurality of object labels obtained for each of the plurality of image sets; and
    determining an asymmetric relation measure between the plurality of target words based a hypernym-hyponym score calculated using the representations computed for the plurality of target words.

2. The method of claim 1, wherein the method comprises:
    calculating a measure based on the representations computed for each of the plurality of target words, the asymmetric relation measure being determined by measures calculated from the representations as a form of using of the representations.

3. The method of claim 2, wherein the measure quantifies informativeness of a corresponding one of the plurality of the target words and the method further comprises:
evaluating a difference in the informativeness between the plurality of target words, the asymmetric relation measure being determined by a difference in the informativeness as the form of using of the representations.

4. The method of claim 3, wherein the informativeness is quantified by an entropy of the representations and the difference is quantified by a ratio of the informativeness of one of the plurality of target words to others of the plurality of target words or a result of subtracting the informativeness of one of the plurality of target words from the informativeness of others of the plurality of target words.

5. The method of claim 1, wherein the asymmetric relation measure is a measure of lexical entailment between the plurality of target words;
wherein determining the asymmetric relation measure further comprises a determination of at least one of a direction of an asymmetric relation and a detection of existence of a forward or reverse relation, and
wherein each target word includes a single word or multiple words independently.

6. The method of claim 1, wherein the plurality of object labels is obtained by requesting visual object recognition with one or more images in each of the plurality of image sets as queries for an object recognition system.

7. The method of claim 6, wherein the object recognition system is capable of distinguishing 5000 or more different visual objects.

8. The method of claim 1, wherein the representations is computed as a histogram vector, the histogram vector having a plurality of elements each storing a statistic of occurrence of each of the plurality of object labels or a statistic in relation to a confidence score of each of the plurality of object labels.

9. A computer system for finding an asymmetric relation between a plurality of target words, by executing program instructions, the computer system comprising:
a memory storing the program instructions;
a processing unit in communications with the memory for executing the program instructions, wherein the processing unit is configured to:
prepare a plurality of image sets each including one or more images relevant to a corresponding one of the plurality of target words by retrieving the one or more images of each of the plurality of image sets with the corresponding one of the plurality of target words as a query for an image search system;
obtain a plurality of object labels for each of the plurality of image sets;
compute a representation for each of the plurality of target words using the plurality of object labels obtained for each of the plurality of image sets; and
determine an asymmetric relation measure between the plurality of target words based on a hypernym-hyponym score calculated using the representations computed for the plurality of target words.

10. The computer system of claim 9, wherein the asymmetric relation measure is a measure of lexical entailment between the plurality of target words;
wherein the processing unit is further configured to determine the asymmetric relation measure by determining at least one of a direction of an asymmetric relation and a detection of existence of a forward or reverse relation, and
wherein each target word includes a single word or multiple words independently.

11. The computer system of claim 9, wherein the computer system is further configured to:
calculate a measure based on the representations computed for each of the plurality of target words, wherein the asymmetric relation measure is determined by measures calculated from the representations as a form of using of the representations.

12. The computer system of claim 11, wherein the measure quantifies informativeness of a corresponding one of the plurality of the target words and the processing unit is further configured to:
evaluate a difference in the informativeness between the plurality of target words, wherein the asymmetric relation measure is determined by a difference in the informativeness as the form of using of the representations.

13. The computer system of claim 12, wherein the informativeness is quantified by an entropy of the representations and the difference is quantified by a ratio of the informativeness of one of the plurality of target words to others of the plurality of target words or a result of subtracting the informativeness of one of the plurality of target words from the informativeness of others of the plurality of the target words.

14. The computer system of claim 9, wherein the representations is computed as a histogram vector, the histogram vector having a plurality of elements each storing a statistic of occurrence of each of the plurality of object labels or a statistic in relation to a confidence score of each of the plurality of the object labels.

15. The computer system of claim 9, wherein the processing unit is further configured to:
request object recognition with the one or more images in each of the plurality of image sets as queries to an object recognition system to obtain the plurality of object labels.

16. A computer program product for finding an asymmetric relation between a plurality of target words, the computer program product comprising a computer readable storage medium having program instructions embodied therewith, the program instructions executable by a computer to cause the computer to perform a method comprising:
preparing a plurality of image sets each including one or more images relevant to a corresponding one of the plurality of the target words, including retrieving the one or more images of each of the plurality of image sets with the corresponding one of the plurality of target words as a query for an image search system;
obtaining a plurality of object labels for each of the plurality of image sets;
computing a representation for each of the plurality of the target words using the plurality of object labels obtained for each of the plurality of image sets; and
determining an asymmetric relation measure between the plurality of target words based on a hypernym-hyponym score calculated using the representations computed for the plurality of target words.

17. The computer program product of claim 16, wherein the asymmetric relation measure is a measure of lexical entailment between the plurality of target words;
wherein determining the asymmetric relation measure further comprises a determination of at least one of a direction of an asymmetric relation and a detection of existence of a forward or reverse relation, and wherein each target word includes a single word or multiple words independently.

18. The computer program product of claim 16, wherein the method comprises:
calculating a measure based on the representations computed for each of the plurality of target words, the asymmetric relation measure being determined by measures calculated from the representations as a form of using of the representations.

19. The computer program product of claim 18, wherein the measure quantifies informativeness of a corresponding one of the plurality of target words and the method further comprises:
evaluating a difference in the informativeness between the target words, the asymmetric relation measure being determined by a difference in the informativeness as the form of using of the representations.

20. The computer program product of claim 19, wherein the informativeness is quantified by an entropy of the representations and the difference is quantified by a ratio of the informativeness of one of the plurality of target words to others of the plurality of target words or a result of subtracting the informativeness of one of the plurality of target words from the informativeness of other of the plurality of target words.

* * * * *